(12) United States Patent
Bachu et al.

(10) Patent No.: US 9,026,496 B1
(45) Date of Patent: May 5, 2015

(54) EFFICIENT BUILDING OF RESTORE LIST

(75) Inventors: Kiran Bachu, Cupertino, CA (US);
Venu Varma, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 126 days.

(21) Appl. No.: 13/250,732

(22) Filed: Sep. 30, 2011

(51) Int. Cl.
*G06F 7/00* (2006.01)
*G06F 17/30* (2006.01)

(52) U.S. Cl.
CPC ................... *G06F 17/30129* (2013.01)

(58) Field of Classification Search
CPC ................................. G06F 17/30129
USPC ................... 707/645, 646, 999.2, 999.204
See application file for complete search history.

(56) References Cited

U.S. PATENT DOCUMENTS

| | | | |
|---|---|---|---|
| 6,041,334 A * | 3/2000 | Cannon .................... | 707/652 |
| 6,073,128 A * | 6/2000 | Pongracz et al. ........... | 707/640 |
| 6,591,269 B1 * | 7/2003 | Ponnekanti ................. | 1/1 |
| 7,165,154 B2 * | 1/2007 | Coombs et al. ............. | 711/162 |
| 7,251,749 B1 * | 7/2007 | Fong et al. ................. | 714/20 |
| 7,266,655 B1 * | 9/2007 | Escabi et al. ............... | 711/162 |
| 7,861,050 B2 * | 12/2010 | Retnamma et al. .......... | 711/162 |
| 7,941,709 B1 * | 5/2011 | Hong et al. ................. | 714/54 |
| 7,966,293 B1 * | 6/2011 | Owara et al. ................ | 707/654 |
| 7,974,952 B1 * | 7/2011 | Reitmeyer et al. .......... | 707/641 |
| 7,984,088 B2 * | 7/2011 | Delorme et al. ............ | 707/828 |
| 8,046,332 B1 * | 10/2011 | Pruthi et al. ................ | 707/644 |
| 8,069,320 B1 * | 11/2011 | Per et al. .................... | 711/161 |
| 8,135,676 B1 * | 3/2012 | Poojary et al. .............. | 707/646 |
| 8,195,612 B1 * | 6/2012 | Nagarkar et al. ........... | 707/644 |
| 8,239,348 B1 * | 8/2012 | Bezbaruah et al. ......... | 707/667 |
| 8,341,122 B2 * | 12/2012 | Sawdon et al. ............. | 707/641 |
| 8,433,863 B1 * | 4/2013 | Orcutt ........................ | 711/162 |
| 8,495,022 B1 * | 7/2013 | Zhu et al. ................... | 707/645 |
| 2005/0071390 A1 * | 3/2005 | Midgley et al. ............. | 707/204 |
| 2005/0223043 A1 * | 10/2005 | Randal et al. ............... | 707/200 |
| 2006/0064444 A1 * | 3/2006 | van Ingen et al. .......... | 707/204 |
| 2008/0034017 A1 * | 2/2008 | Giampaolo et al. ........ | 707/204 |
| 2008/0109495 A1 * | 5/2008 | Herberger et al. .......... | 707/204 |
| 2008/0243953 A1 * | 10/2008 | Wu et al. .................... | 707/204 |
| 2010/0042598 A1 * | 2/2010 | Shinjo et al. ............... | 707/3 |
| 2010/0082553 A1 * | 4/2010 | Beatty et al. ............... | 707/679 |
| 2011/0022780 A1 * | 1/2011 | Wakrat et al. .............. | 711/103 |
| 2011/0113012 A1 * | 5/2011 | Gruhl et al. ................ | 707/646 |
| 2011/0125714 A1 * | 5/2011 | Manson ...................... | 707/645 |
| 2011/0125717 A1 * | 5/2011 | Manson ...................... | 707/679 |
| 2012/0011099 A1 * | 1/2012 | Shin et al. .................. | 707/646 |
| 2012/0047341 A1 * | 2/2012 | Ishinabe et al. ............ | 711/162 |
| 2012/0078855 A1 * | 3/2012 | Beatty et al. ............... | 707/676 |
| 2012/0143835 A1 * | 6/2012 | Aronovich et al. ......... | 707/696 |
| 2012/0158666 A1 * | 6/2012 | Anglin et al. .............. | 707/679 |
| 2013/0080397 A1 * | 3/2013 | Payne et al. ............... | 707/681 |

* cited by examiner

*Primary Examiner* — Miranda Le
(74) *Attorney, Agent, or Firm* — Van Pelt, Yi & James LLP

(57) ABSTRACT

A system for building a restore list includes a processor and a memory. The processor is configured to determine whether a next sibling record includes a directory. The directory is popped from a directory stack. In the event that the next sibling record includes a subdirectory of the directory, the processor is configured to push a directory path associated with the next sibling record onto the directory stack. In the event that the next sibling record does not include a subdirectory, the processor is configured to add the latest index record associated with the latest index record to a restore list. The memory coupled to the processor and configured to provide the processor with instructions.

18 Claims, 10 Drawing Sheets

500

Restore List

| Name | Backup Version | Start Point | Length |
|---|---|---|---|
| file2 | T4 | 100 | 100 |
| file1 | T1 | 100 | 400 |
| file4 | T4 | 200 | 100 |
| file3 | T5 | 100 | 300 |
| file5 | T5 | 400 | 100 |

Coalesced Restore List

| Name | Backup Version | Start Point | Length |
|---|---|---|---|
| file2file4 | T4 | 100 | 200 |
| file1 | T1 | 100 | 400 |
| file3file5 | T5 | 100 | 400 |

FIG. 5B

EFFICIENT BUILDING OF RESTORE LIST

BACKGROUND OF THE INVENTION

Enterprises as well as individuals are becoming increasingly dependent on computers. As more and more data are generated, the need for efficient and reliable filesystems is increasing. There are a variety of filesystems in existence today, utilizing both local and remote storage. Some filesystems use both an originating filesystem and a replica filesystem in order to ensure the safety of the data by copying the data from the local to the replica system. Some replica filesystems include data versioning, enabling recovery of the state of the originating filesystem at multiple previous points in time by including multiple versions of the originating data. Each version of the data may comprise a complete version of the data, or each version of the data may comprise an incremental version of the data, describing changes to the data since the previous version was stored. Some systems create a full backup at regularly scheduled intervals (e.g., once a week, once a month) and create incremental backups at points between the full backups. When it is desired to restore a complete version of the data at a time when only an incremental backup was made, the system must first create a restore list of the data segments comprising the complete version. The data segments may come from a full backup and one or more incremental backups. The system must determine what data is current and what data has been superseded by data in later incremental backups. A previous approach to this problem involves building the entire directory structure in memory from a full backup and modifying it with the changes described in each incremental backup until the desired version has been reached. Once the up-to-date directory structure has been created in memory, it is traversed to create the restore list. This approach is slow and memory-intensive. In some cases, given the size of current storage systems, the creation of the up-to-date directory structure exceeds the memory capacity of the system and causes a crash.

BRIEF DESCRIPTION OF THE DRAWINGS

Various embodiments of the invention are disclosed in the following detailed description and the accompanying drawings.

FIG. 5A is a diagram illustrating an embodiment of a restore list.

FIG. 5B is a diagram illustrating an embodiment of a coalesced restore list.

DETAILED DESCRIPTION

Figure 1:
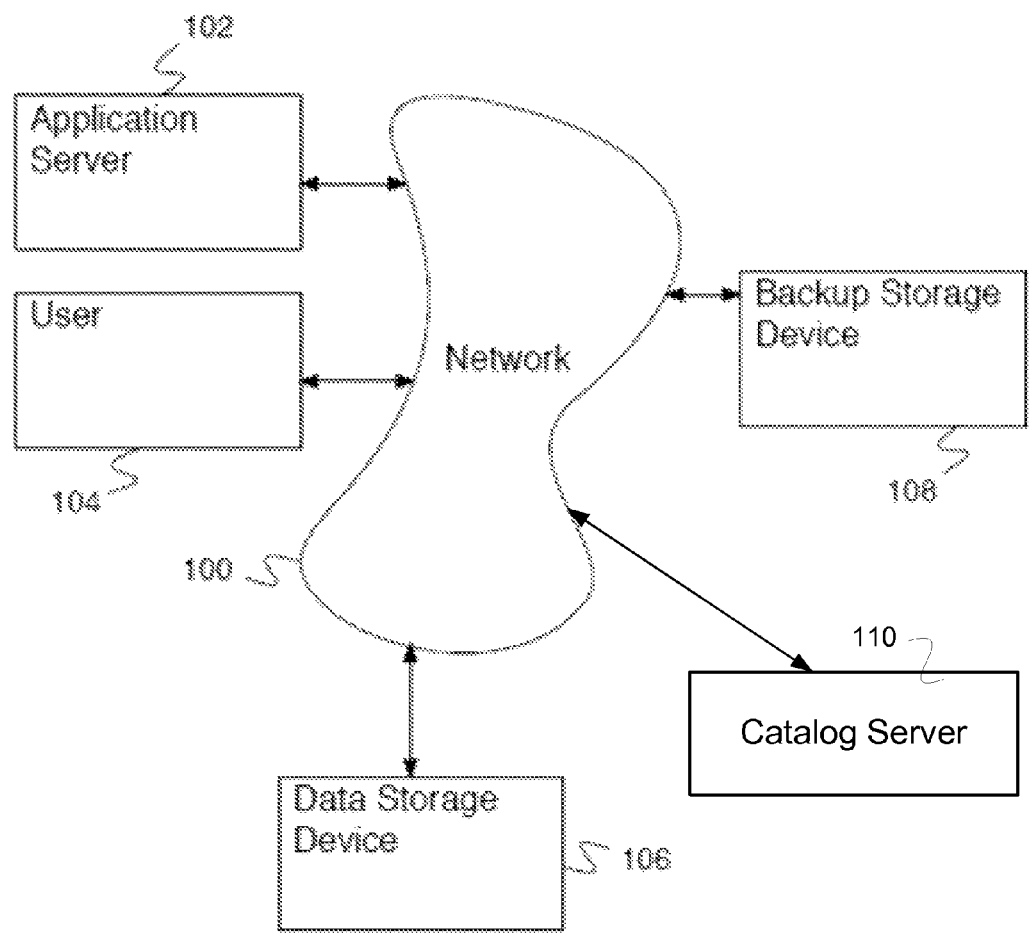
FIG. 1 is a block diagram illustrating an embodiment of a system for asynchronous multi-node coordinated filesystem

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for building a restore list comprises a processor and a memory. The processor is configured to determine whether a next sibling record comprises a directory. The directory is popped from a directory stack. In the event that the next sibling record comprises a subdirectory of the directory, the processor is configured to push a directory path associated with the next sibling record onto the directory stack. In the event that the next sibling record does not comprise a subdirectory, the processor is configured to add the latest index record associated with the latest index record to a restore list. The memory coupled to the processor and configured to provide the processor with instructions.

Efficient building of a restore list is disclosed. The resource-intensive step of creating a complete up-to-date directory structure is bypassed, and instead a restore list is built directly. The directory structure is traversed iteratively, starting with the root directory of the restore. The most up-to-date contents of the directory are determined from the versioned or recent incremental backups. Files stored in the directory are added to the restore list, along with the backup version they are stored in, data offset within the backup, and file size. Subdirectories stored in the directory are added to a list of directories to traverse. The process is then repeated for the directories stored in the list of directories to traverse, removing them from the directory list as they are processed. When the directory list is empty, the entire directory structure has been traversed. Every file and where to find it within the backups has then been added to the restore list.

In some embodiments, the input to building the restore list is a directory path and an optional time range for the restore files desired. To restore the directory associated with the directory path from backup storage device(s), a restore list needs to be constructed that basically is a representation of data chunks needed from backup storage device(s). In some cases, because of incremental backups, the data chunks associated with the restoration of the directory are spread across a single backup storage device or across multiple backup storage devices. A data chunk is represented in the restore list by a location on a backup storage device and a data length. For each file that is backed up, data chunk info is stored in a catalog server or on some other medium. During restores, the catalog server is consulted to collect all the necessary data chunk information required for restoring a directory or file.

A conventional method to form a restore list of chunk information is to expand the directory being restored (e.g., by constructing the directory tree in memory) by consulting a catalog server and then converting the tree into a restore list. This method, however, is highly recursive and faces stack overflow issues, as well as being a processor-intensive and memory-intensive operation. It is quite challenging to construct a restore list that is efficient and fast.

An efficient building of a restore list is disclosed comprising eliminating the building of the directory tree in memory and creating a restore list that is compressed. This is achieved by avoiding the use of recursion and instead using a directory stack to construct the restore list as well as inline coalescing of the chunk list to compress the restore list.

In some embodiments, multiple directories are removed from the list of directories to traverse and queried simultaneously, using a single query. The contents of each directory are determined, and the multiple directory contents lists are returned together, in a single file transfer. This process reduces the network and file transfer overhead.

Up-to-date contents of directories are determined by querying the versioned or incremental backups for directory contents. Incremental backups store only change information; if a file is unchanged it will not be represented in an incremental backup. Thus, to guarantee a complete coverage of a directory's content information, backup versions are queried starting with the backup version at the desired time and working backwards until a full backup is reached (or if no full backup is reached, then until the first backup in the chain). A current directory content list is created as an empty list, and the contents of the directory as it is stored in each incremental backup are added to the list. If some or all of the directory contents of a given incremental backup are already stored in the current directory content list, those directory contents have been superseded by the versions already stored and already referred to by a prior processed backup list, and so they are ignored. When the directory contents list is updated with the information from a full backup, its information is complete.

In some embodiments, the restore list additionally undergoes a coalescing process. The coalescing process locates data files stored adjacently in the same backup file, and combines the files into a single file that can be retrieved with a single request. In some use cases, only a small fraction of data stored in the incremental backup versions will be superseded by later versions; the majority will be present in the up-to-date version and on the restore list. If the entirety of an incremental backup is present on the restore list, the coalescing process will cause it to be retrieved with a single call, rather than one for each file. If a majority of an incremental backup is present on the restore list, the coalescing process can reduce the number of calls to a small number, depending on the file organization within the incremental backup. In some embodiments, the coalescing process is performed on the restore list after the list is built. In some embodiments, the coalescing process is performed on the restore list after at least part of the list is built. Performing a coalescing process on a restore list that has been completely or partially built can be assisted by first ordering the restore list by storage location. In some embodiments, the restore list is ordered by a storage location of a file within each backup file in the restore list. In some embodiments, the restore list is ordered by a storage location of each backup file associated with a file in the restore list. In some embodiments, the coalescing process is performed on the restore list each time a new data file is added.

In some embodiments, efficient building of a restore list is used as part of a data restore process (e.g., restoring data to a previous state due to data corruption, data loss, user error, etc.). In some embodiments, the restore list is used to restore data. In some embodiments, efficient building of a restore list is used as part of a synthetic full backup creation process (e.g., creation of a full backup corresponding to a point in time at which only an incremental backup was created in order to speed future data restoration processes).

FIG. 1 is a block diagram illustrating an embodiment of a system for efficient building of a restore list. In the example shown, the system comprises application server 102, user 104, data storage device 106, backup storage device 108, and catalog server 110, each communicating with network 100. User 104 accesses applications executing on application server 102 and data stored in data storage device 106. In some embodiments, user 104 accesses data stored on backup storage device 108. In some embodiments, software is used to coordinate synchronization of data between data storage device 106 and backup storage device 108. In various embodiments, software used to coordinate synchronization of data is stored on application server 102, data storage device 106, backup storage device 108, or on any other appropriate computing device. In various embodiments, backup storage device 108 comprises a deduplicating backup system, a compressed backup system, an encrypted backup system, or a backup system comprising data stored in any other appropriate way.

Network 100 comprises one or more of the following: a local area network, a wide area network, a wired network, a wireless network, the Internet, a fiber network, a storage area network, or any other appropriate network enabling communication. In various embodiments, data storage device 106 and backup storage device 108 comprise single storage devices such as a hard disk, a tape drive, a semiconductor memory, a plurality of storage devices such as a redundant array system (e.g., a redundant array of independent disks (RAID)), a system for storage such as a library system or network attached storage system, a virtual storage (e.g., a LUN, or logical unit), or any other appropriate storage device or system.

In some embodiments, backup storage device 108 stores not only the current state of data storage device 106, but also information describing previous states of data storage device 106. In some embodiments, backup storage device 108 is configured to keep a record of every change made to data storage device 106. In some embodiments, backup storage device 108 only keeps a record of changes made to data storage device 106 at certain times (e.g., at fixed times of the day, at a predetermined interval, after a certain number of changes, etc.). In some embodiments, every backup record made by backup storage device 108 comprises a complete copy of the data stored on data storage device 106. In some embodiments, some of the backup records made by backup storage device 108 comprise a complete copy of the data stored on data storage device 106 and some of the backup records stored by backup storage device 108 comprise an incremental copy of the data stored on data storage device 106 representing changes made since the last backup record was made. In some embodiments, catalog server 110 stores information regarding backups store on backup storage device 108 (e.g., directory index records, file index records, etc.). In some embodiments, catalog server 110 is merged with backup storage device 108.

Figure 2:
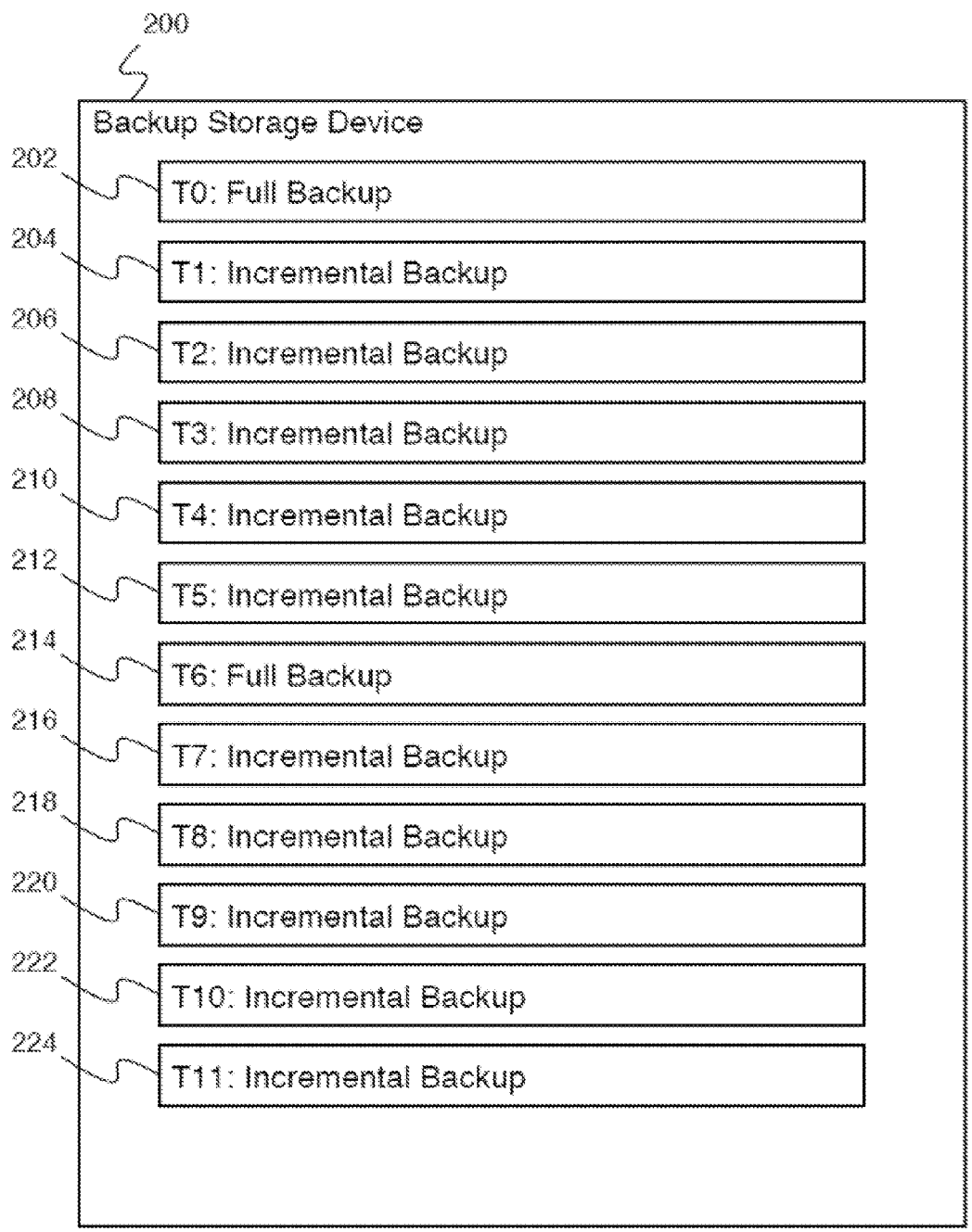
FIG. 2 is a block diagram illustrating an embodiment of a backup storage device.

FIG. 2 is a block diagram illustrating an embodiment of a backup storage device. In some embodiments, backup storage device 200 comprises backup storage device 108 of FIG. 1. In some embodiments, backup storage device 200 stores backup records of a data storage device (e.g., data storage device 106 of FIG. 1). In the example shown, backup storage device 200 comprises full backup records and incremental backup records. Full backup records comprise the complete contents of the data storage device. Incremental backup records comprise the changes made to the data storage device since the last backup record was stored. Backup storage device 200 comprises full backup 202, stored at time T0. Backup storage device 200 additionally comprises incremental backup 204, stored at time T1; incremental backup 206, stored at time T2; incremental backup 208, stored at time T3; incremental backup 210, stored at time T4; and incremental backup 212, stored at time T5. Each incremental backup represents changes made since the previous backup was stored. Recovering the state of the data storage device at time T5 requires some or all of full backup 202, incremental backup 204, incremental backup 206, incremental backup 208, incremental backup 210, and incremental backup 212.

Backup storage device 200 additionally comprises full backup 214, stored at time T6. Backup storage device 200 further comprises incremental backup 216, stored at time T7; incremental backup 218, stored at time T8; incremental backup 220, stored at time T9; incremental backup 222, stored at time T10; and incremental backup 224, stored at time T11. Recovering the state of the data storage device at time T11 requires some or all of full backup 214, incremental backup 216, incremental backup 218, incremental backup 220, incremental backup 222, and incremental backup 224. Recovering the state of the data storage device at time T11 does not require any backups made before time T6, as backup 214, made at time T6, is a full backup, and captures the complete state of the data storage device at that time.

Figure 3:
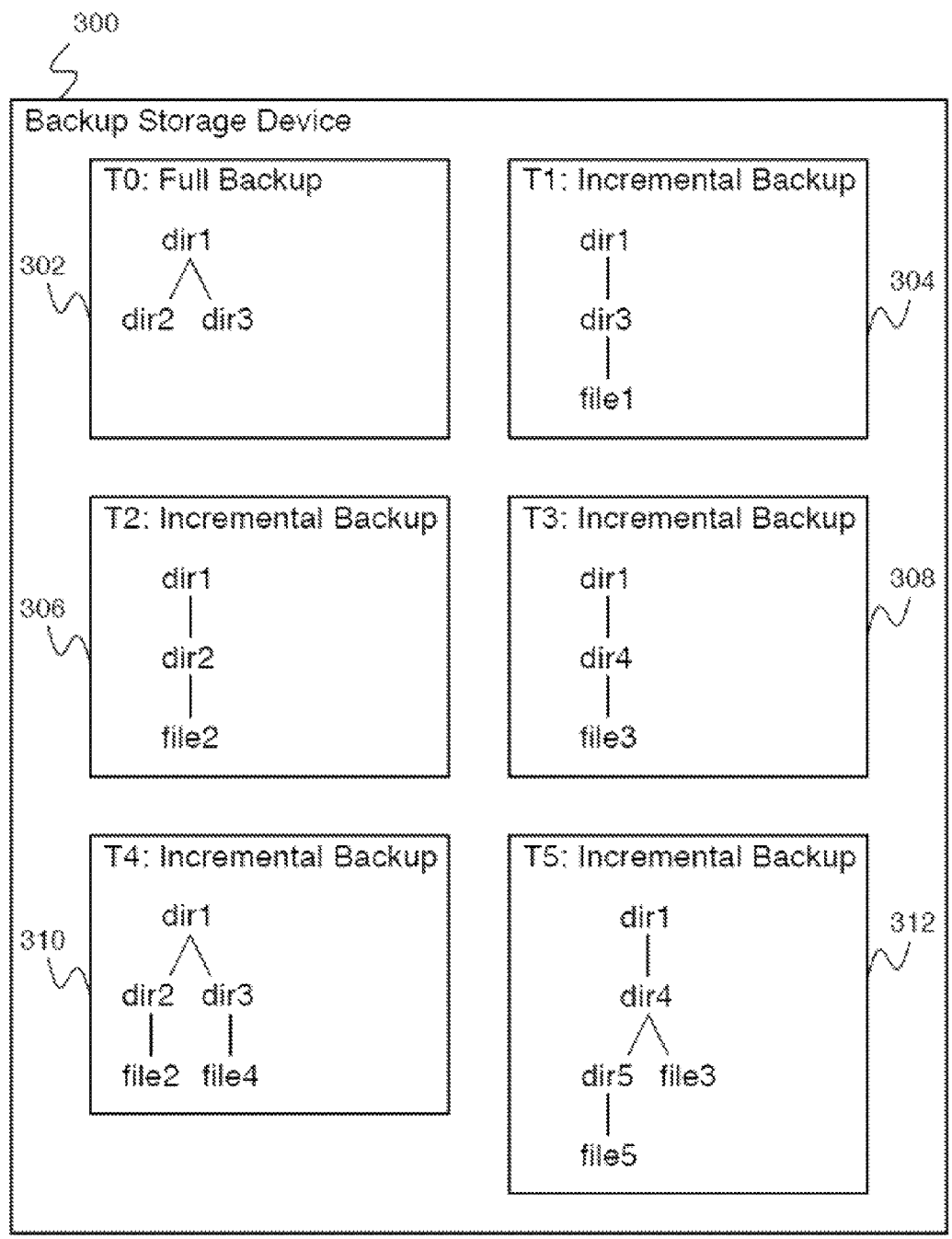
FIG. 3 is a block diagram illustrating an embodiment of a backup storage device.

FIG. 3 is a block diagram illustrating an embodiment of a backup storage device. In some embodiments, backup storage device 300 comprises backup storage device 108 of FIG. 1. In some embodiments, backup storage device 300 stores backup records of a data storage device (e.g., data storage device 106 of FIG. 1). In the example shown, backup storage device 300 comprises full backup records and incremental backup records. Full backup 302 comprises a record of the complete state of the data storage device at time T0. Full backup 302 comprises root directory dir1, storing subdirectories dir2 and dir3. Incremental backup 304 comprises root directory dir1, storing subdirectory dir3, storing file file1. This indicates that the only change between time T0 and time T1 is the creation of file file1 in directory dir3. Directory dir2 has not been changed, so it is not present in incremental backup 304. Incremental backup 306 comprises root directory dir1, storing subdirectory dir2, storing file file2. This indicates that the only change between time T1 and time T2 is the creation of file file2 in directory dir2. Incremental backup 308 comprises root directory dir1, storing subdirectory dir4, storing file file3. This indicates that between time T2 and time T3, directory dir4 was created in directory dir1, and file file3 was created in directory dir4. Incremental backup 310 comprises root directory dir1, storing subdirectories dir2 and dir3. Subdirectory dir2 stores file file2 and subdirectory dir3 stores file file4. This indicates that between T3 and T4, file2 in directory dir2 was modified, and file4 in directory dir3 was created. Incremental backup 312 comprises root directory dir1, storing subdirectory dir4, storing subdirectory dir5 and file file3. Subdirectory dir5 stores file file5. This indicates that between T4 and T5, directory dir5 was created in directory dir4, file file5 was created in directory dir5, and file file3 was created in directory dir4.

Figure 4:
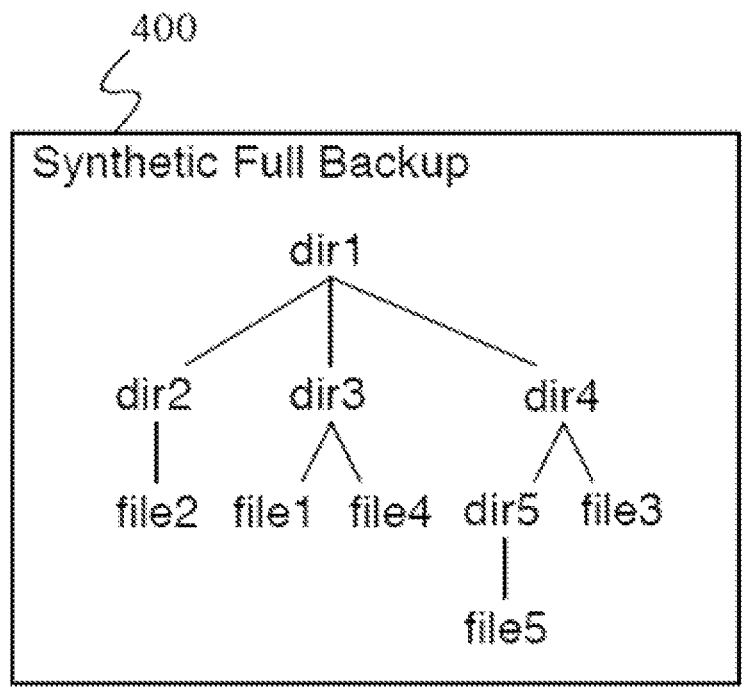
FIG. 4 is a block diagram illustrating an embodiment of a synthetic full backup.

FIG. 4 is a block diagram illustrating an embodiment of a synthetic full backup. In some embodiments, the synthetic full backup is stored on a backup storage device (e.g., backup storage device 108 of FIG. 1). In some embodiments, a synthetic full backup comprises a full backup. In some embodiments, a synthetic full backup comprises a full backup created by the backup storage device from a full backup and subsequent incremental backups. In some embodiments, a synthetic full backup comprises a full backup created in order to speed future data restore processes. In some embodiments, synthetic full backup 400 comprises a synthetic full backup created on backup storage device 300 of FIG. 3. In some embodiments, synthetic full backup 400 comprises a synthetic full backup corresponding to the same data version as incremental backup 312 of FIG. 3. In the example shown, synthetic full backup 400 comprises root directory dir1, storing subdirectories dir2, dir3, and dir4. Subdirectory dir2 stores file2, subdirectory dir3 stores file1 and file4, and subdirectory dir4 stores subdirectory dir5 and file file3. Subdirectory dir5 stores file file5.

FIG. 5A is a diagram illustrating an embodiment of a restore list. In some embodiments, a restore list comprises names and locations of files for restoring data or for creating a synthetic full backup (e.g., synthetic full backup 400 of FIG. 4). In some embodiments, a restore list comprises a list of files backed up on a backup storage device (e.g., backup storage device 108 of FIG. 1). In some embodiments, a restore list comprises a list of file locations on a backup storage device. In some embodiments, one or more of the file locations comprises a location that is associated with an incremental backup. In some embodiments, one or more of the file locations comprises a location that is associated with a full backup. In some embodiments, restore list 500 of FIG. 5 comprises a restore list created by backup storage device 300 of FIG. 3, for restoring data to time T5, corresponding to the version of the data when incremental backup 312 of FIG. 3 was created. In some embodiments, restore list 500 of FIG. 5 is used as part of creating synthetic full backup 400 of FIG. 4. In the example shown, restore list 500 comprises a list of files along with the backup version where the file is stored, the start point of the file within the backup, and the length of the file. File file2 is indicated as stored in the backup made at T4 (i.e., incremental backup 310 of FIG. 3). Since the version of file file2 made at T2 (i.e., and stored in incremental backup 306 of FIG. 3) has been superseded by the version made at T4, the version made at T2 is ignored. File file1 is indicated as stored in the backup made at T1. File file4 is indicated as stored in the backup made at T4. File file3 is indicated as stored in the backup made at T5. The version of file file3 stored in the backup made at time T3 has been superseded, and is ignored. File file5 is indicated as stored in the backup made at time T5.

FIG. 5B is a diagram illustrating an embodiment of a coalesced restore list. In some embodiments, a coalesced restore list comprises a restore list wherein any files found to reside at adjacent points in the same backup version are merged so as to reduce the total number of retrieve file calls and to reduce a memory foot print in the case of large data sets. In the example shown, coalesced restore list 550 comprises files file2file4, file1, and file3file5. File file2file4 comprises a merged version of files file2 and file4, as they were found to reside adjacently in the backup version made at T4. File file1 was not found to reside adjacently to any other files necessary for the restore list, and remains by itself. File file3file5 comprises a merged version of files file3 and file5, as they were found to reside adjacently in the backup version made at T5. In some embodiments, coalesced restore list 550 is created by processing a restore list (e.g., restore list 500 of FIG. 5). In some embodiments, coalesced restore list 550 is created by checking files to see if they can be coalesced as they are added to the restore list, and an uncoalesced version is never explicitly created.

Figure 6:
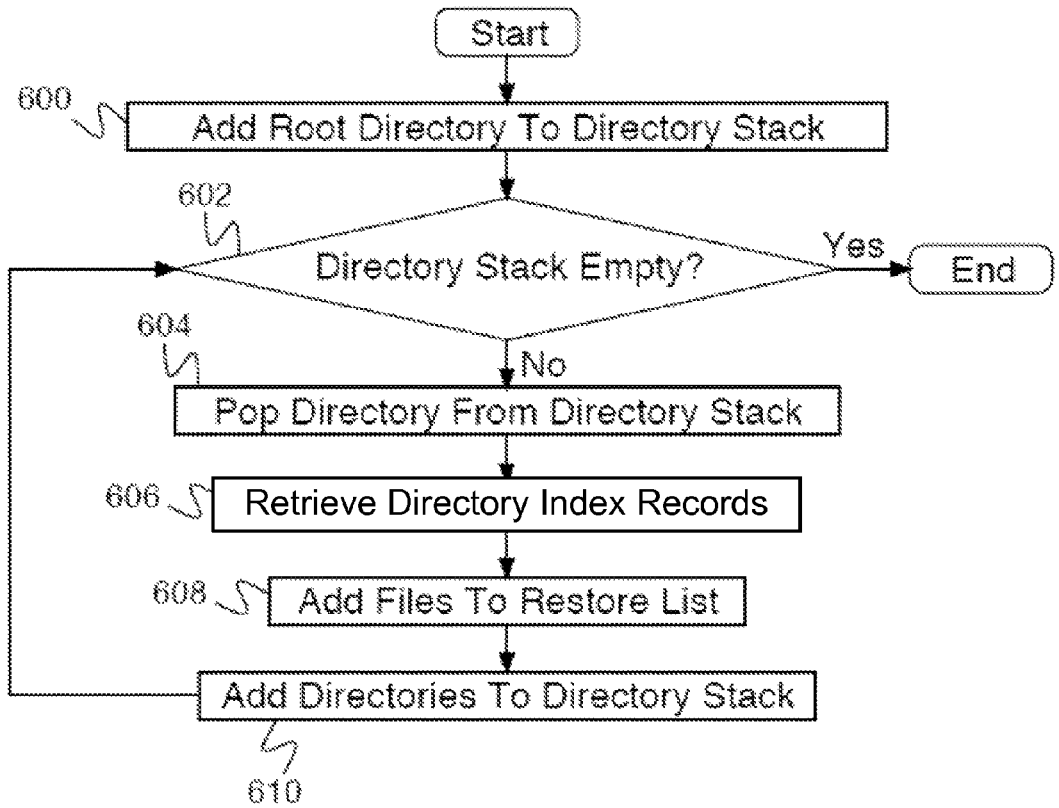
FIG. 6 is a flow diagram illustrating an embodiment of a process for efficiently creating a restore list.

FIG. 6 is a flow diagram illustrating an embodiment of a process for efficiently creating a restore list. In some embodiments, the process of FIG. 6 avoids the use of a recursive function. In some embodiments, the process of FIG. 6 is used by a backup storage device (e.g., backup storage device 108 of FIG. 1) for creating a restore list (e.g., restore list 500 of FIG. 5A) or a coalesced restore list (e.g., coalesced restore list 550 of FIG. 5B) to restore data stored on a data storage device (e.g., data storage device 106 of FIG. 1). In the example shown, in 600, the root directory is added to the directory stack. The directory stack is a customized implementation that replaces the use of recursive methods. Directory stack is an in-memory stack like implementation that holds list of directory paths to process. It is a replacement for a recursive function since a recursive function can produce a stack overflow if the directories are large. In some embodiments, the root directory can be any directory in the filesystem. In some embodiments, the root directory is determined by the user executing the restore process and communicated to the backup storage device (e.g., via a user prompt, a command-line argument, etc.). In some embodiments, the root directory is the filesystem root directory by default. The directory stack is a stack-ordered (e.g., last-in first-out) list of directories to be processed. In some embodiments, the directory stack stores a directory for later processing during which one or more directory files of the directory are identified to be added to the restore list and subdirectories of the directory, if any, are identified to be added to the directory stack. Prior to 600, the directory stack is empty. In 602, it is determined whether the directory stack is empty. If it is determined in 602 that the stack is empty, the process ends. If it is determined in 602 that the stack is not empty, control passes to 604. In 604, a directory is popped from the directory stack. In some embodiments, more than one directory is popped from the directory stack, and the more than one directories are subsequently processed as a batch. In some embodiments, the directory comprises a directory stored on the data storage device that is backed up on the backup storage device.

In 606, the directory index record(s) is/are retrieved for the directory or directories popped from the directory stack. A directory index record contains the list of siblings of this directory. If a sibling is a directory, it is pushed into the directory stack for further processing. If a sibling is a file, retrieve a latest "file index record" which contains metadata. Throw away the index record after adding it to the restore list. In some embodiments, the directory index record comprises the most recent directory index. The directory index comprises an index record from a catalog server that encompasses all the metadata of a file. The metadata includes access control lists (ACL's), location in the backup storage device, stat, etc. In some embodiments, the restore list is created as part of a data time-travel process (e.g., returning the data not to the most recent version but to a version created at a specific point in the past) and the directory index records comprises the directory index at the point to which the data is time-traveling. The directory index records for a given directory is determined by retrieving a directory index from a backup file (e.g., a backup file from the backups stored in backup storage device 300 of FIG. 3 or on a catalog server), adding files and directories from the directory index to the directory index records if they are not already present, and repeating the process until a full backup file is processed. In some embodiments, the directory index the backup file is associated with comprises an incremental backup file. In some embodiments, the directory index the backup file is associated with comprises a full backup file. In 608, files found in the directory index in 606 are added to the restore list. When each file is added to the restore list, it is added along with information describing which backup it is stored in, where in the backup the file starts, and how long the file is. In some embodiments, when each file is added to the restore list, a coalescing process is executed to determine if the file is stored adjacently to another file on the restore list and, if it is found that the file is stored adjacently to another file on the restore list, merging the two files into a single entry on the restore list. In 610, directories found in the directory index in 606 are added to the directory stack. Control then passes to 602.

Figure 7:
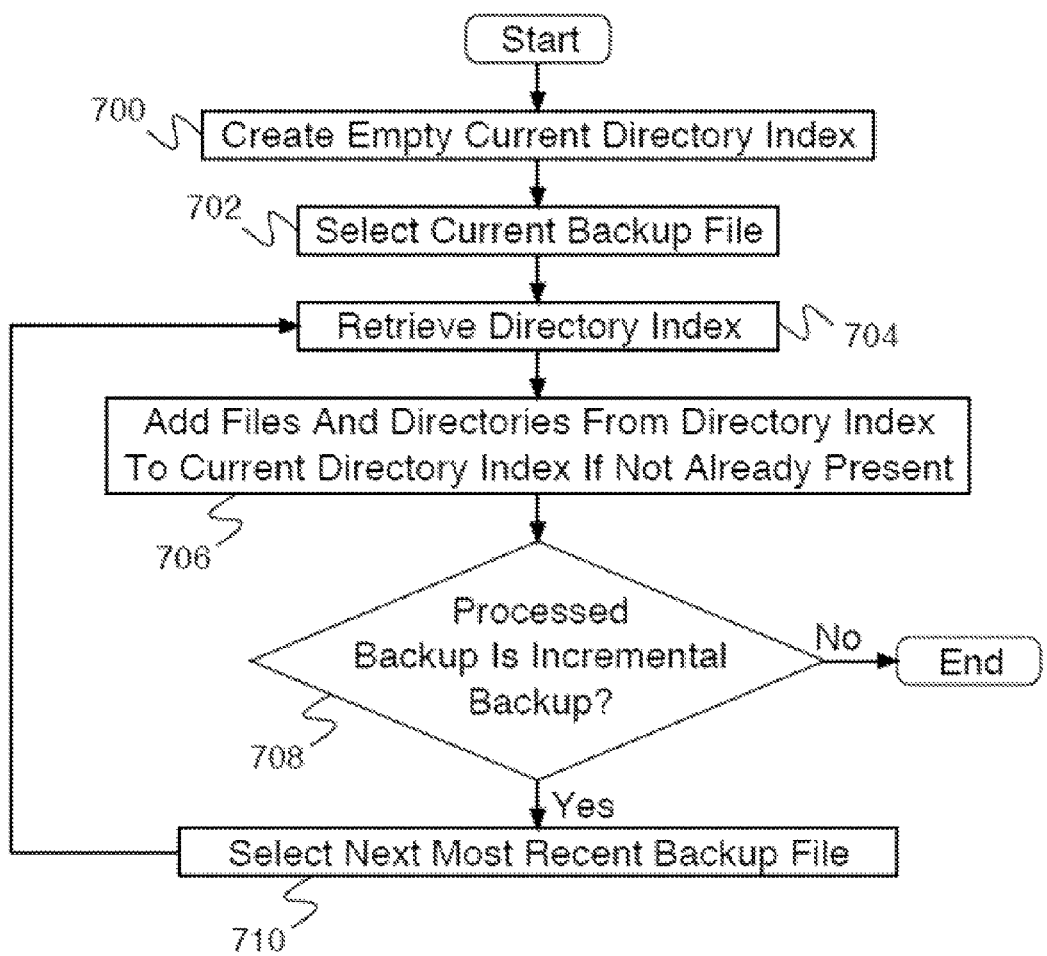
FIG. 7 is a flow diagram illustrating an embodiment of a process for retrieving a directory index records.

FIG. 7 is a flow diagram illustrating an embodiment of a process for retrieving a directory index records. In some embodiments, the process of FIG. 7 implements 606 of FIG. 6. In some embodiments, the directory index record comprises the most recent directory index. In some embodiments, the directory index records is retrieved as part of a data time-travel process (e.g., returning the data not to the most recent version but to a version created at a specific point in the past) and the directory index records comprises the directory index at the point to which the data is time-traveling. In the example shown, in 700, an empty directory index records is created. The empty directory index record is filled with the directory index records contents as a result of the process of FIG. 7. In 702, the current backup file is selected. The current backup file comprises the backup file corresponding to the time of the directory index records being retrieved.

In 704, the directory index is retrieved from the current backup file. In some embodiments, the directory index is retrieved from the current backup file using a standard directory index listing command (e.g., 'ls', 'dir', etc.). In 706, files and directories from the directory index are added to the directory index records if not already present. Each file and directory retrieved is checked to see if it has already been added to the directory index records at an earlier point in the process. If the file or directory has been added to the directory index records at an earlier point in the process, it is discarded. If the file or directory has not been added to the directory index records at an earlier point in the process, it is added to the directory index records. In some embodiments, when a file is added to the directory index records, information describing the backup file it was found in is included along with the file. When all files and directories in the directory index have been checked and added to the directory index records or discarded, control passes to 708. In 708, it is determined whether the backup file being processed is an incremental backup. If the backup file being processed is not an incremental backup (e.g., it is a full backup), then the directory index records has been created completely, and the process ends. If the backup file being processed is an incremental backup, then more backup files are necessary to create the complete directory index records, and control passes to 710. In 710, the next most recent backup file is selected, and control passes to 704.

Figure 8:
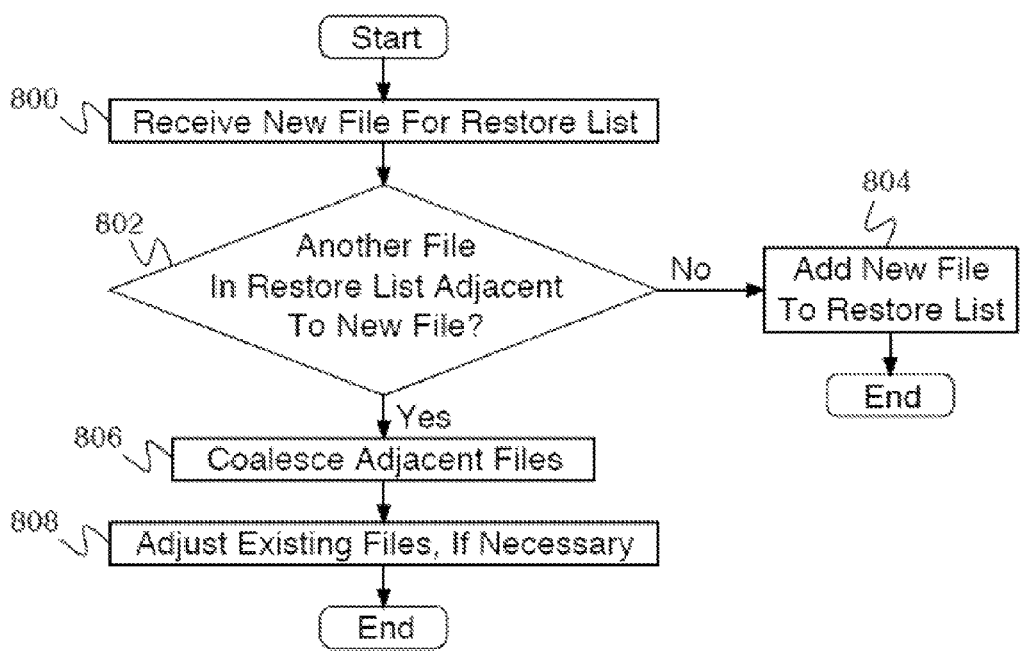
FIG. 8 is a flow diagram illustrating an embodiment of a process for coalescing data files as they are added to a restore list.

FIG. 8 is a flow diagram illustrating an embodiment of a process for coalescing data files as they are added to a restore list. In some embodiments, the process of FIG. 8 implements 608 of FIG. 6. In the example shown, in 800, a new file is received for the restore list. A new file for the restore list comprises a file name indicator, a backup file indicator, a file start point indicator, and a file length indicator. In 802, it is determined whether there is another file in the restore list adjacent to the new file. A file in the restore list adjacent to the new file comprises a file stored in the same backup file that has the same end point as the start point of the new file, or that has the same start point as the end point of the new file. If another file in the restore list is not found to be adjacent to the new file, control passes to 804. In 804, the new file is added to the restore list, and the process ends. If another file in the restore list is found to be adjacent to the new file in 802, control passes to 806. In 806, the adjacent files are coalesced. In some embodiments, coalescing the adjacent files comprises adjusting the file location indicators (e.g., start point and length) of the adjacent file to include the new file. The length of the new file is added to the length of the adjacent file, and the sum becomes the new length of the coalesced file. If the adjacent file is found to be immediately before the new file, the start point of the coalesced file becomes the start point of the adjacent file. If the adjacent file is found to be immediately after the new file, the start point of the coalesced file becomes the start point of the new file. In some embodiments, the name of the coalesced file becomes a combination of the names of the new file and the adjacent file. In 808, existing files are adjusted, if necessary. In some embodiments, the process coalesces a large number of files that are adjacent into just a single file. In some embodiments, if coalescing is not performed, then the restore list requires a large memory footprint and a large transfer of the restore list over a network to the backup storage device.

In various embodiments, the restore list is ordered according to a file location, a file location within a backup file, a backup file location, a backup date, a file date, a file size, a backup size, or any other appropriate ordering criteria.

Figure 9:
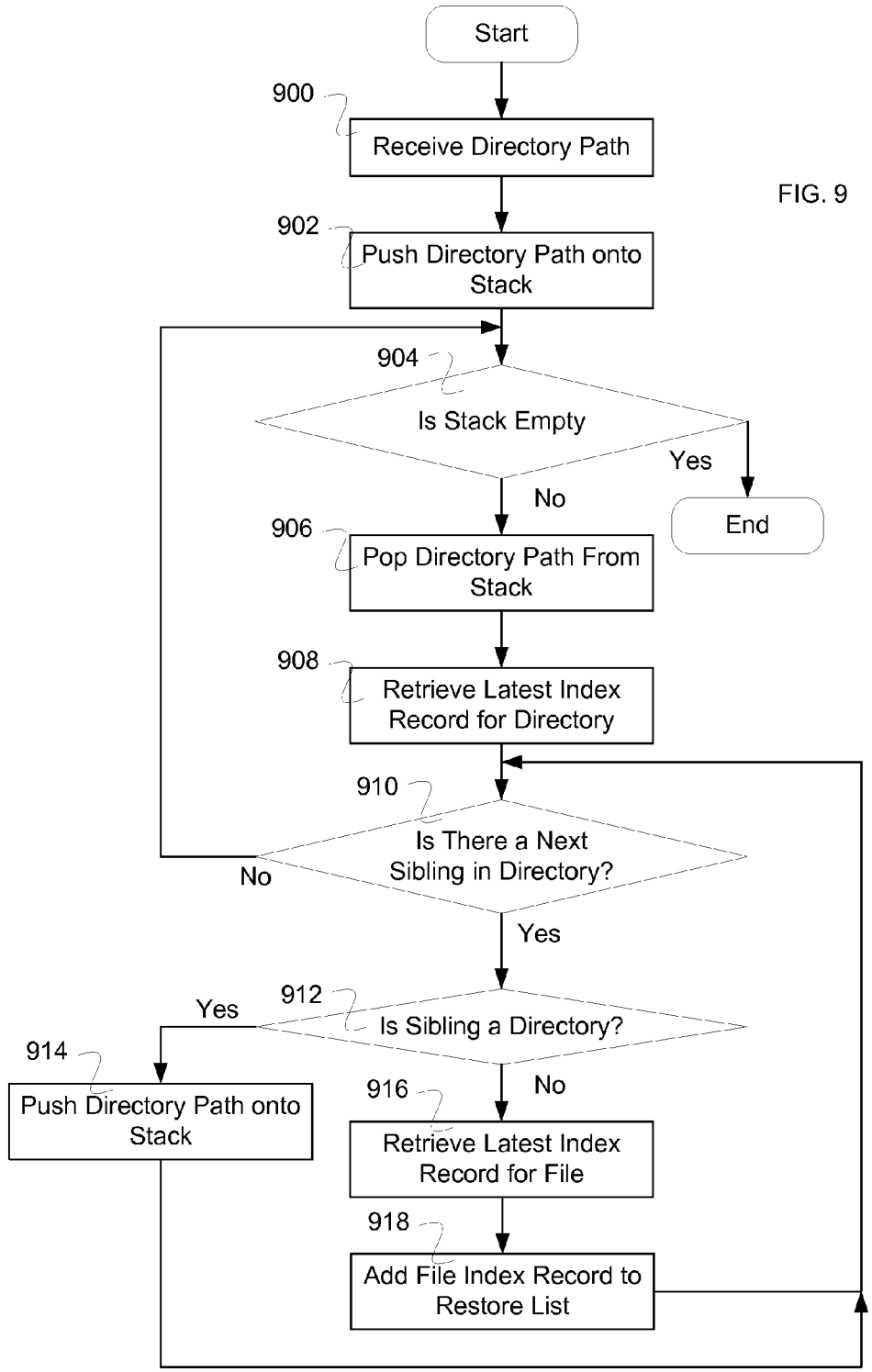
FIG. 9 is a flow diagram illustrating an embodiment of a process for efficiently building a restore list of a given path.

FIG. 9 is a flow diagram illustrating an embodiment of a process for efficiently building a restore list of a given path. In the example shown, in 900 a directory path is received. In 902, the directory path is pushed onto a stack. For example, the directory path is pushed onto a directory stack (e.g., a linked list implementation of a stack that only allows storing of directory paths). In 904, it is determined whether the stack is empty. In the event that the stack is empty, the process ends. In the event that the stack is not empty, in 906 the directory path is popped from the stack. In 908, the latest index record for the directory is retrieved. For example, retrieving the latest index record for the director comprises a querying a catalog server for a latest index record starting from the latest incremental backup all the way back to a full backup. These index records are stored in the catalog server when backups are stored. A directory index record comprises a list of siblings, chunk information, status and/or statistics, access control lists, etc. Chunk information comprises a backup location (e.g., a location where the chunk resides on a backup storage device) and data length. In 910, it is determined whether there is a next sibling in the directory. In the event that there is not a next sibling in the directory, control passes to 904. In the event that there is a next sibling in the directory, in 912 it is determined whether the sibling is a directory (e.g., a subdirectory of the directory). In the event that the sibling is a directory, in 914 the directory path is pushed onto the stack and control passes to 910. In the event that the sibling is not a directory (e.g., a file), then in 916 the latest index record for the file is retrieved. For example, retrieving the latest index record for the file comprises a querying a catalog server for a latest index record starting from the latest incremental backup all the way back to a full backup. These index records are stored in the catalog server when backups are stored. A file index record comprises chunk information, status and/or statistics, access control lists, etc. In 918, the file index record is added to the restore list and control passes to 910. In some embodiments, the restore list is a representation (e.g., a stored list) of a list of all chunks required for a restoration of the data represented in the list.

Figure 10:
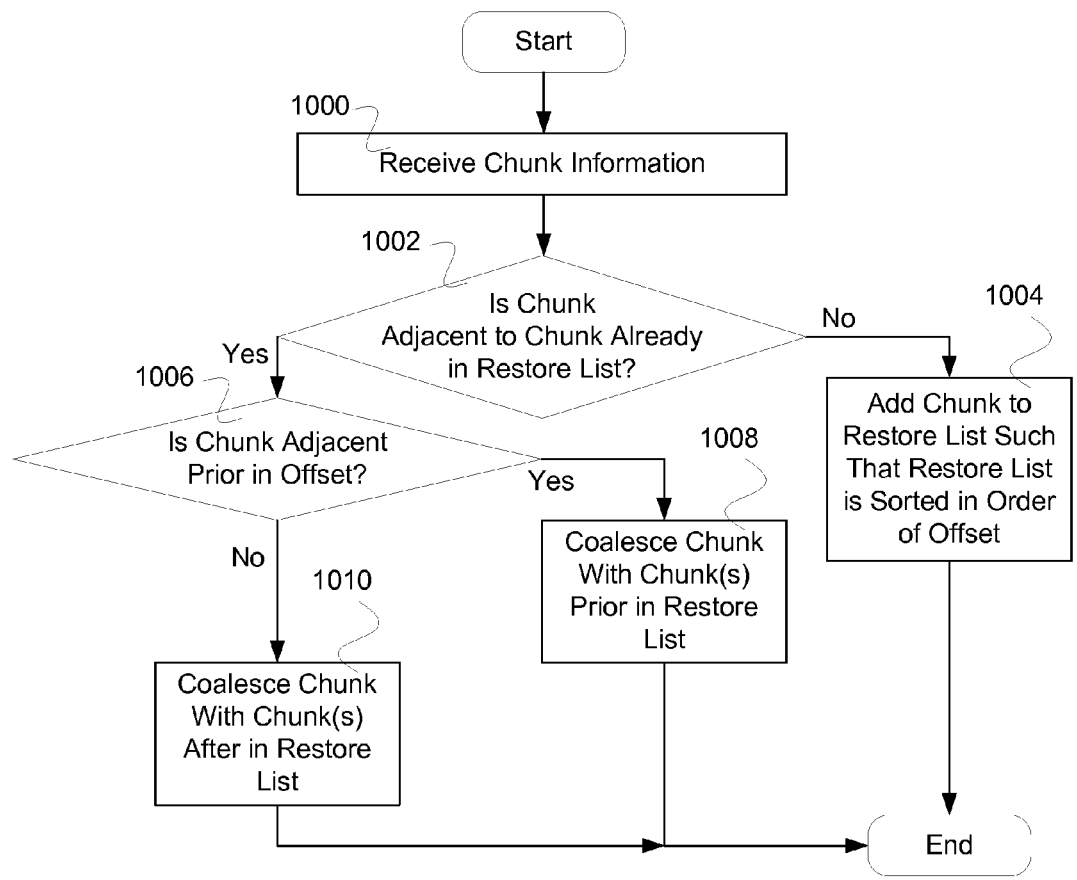
FIG. 10 is a flow diagram illustrating an embodiment of a process for adding to a restore list.

FIG. 10 is a flow diagram illustrating an embodiment of a process for adding to a restore list. In some embodiments, the process of FIG. 10 is used to implement 918 of FIG. 9. In the example shown, in 1000 chunk information is received. For example, the chunk information is received from a catalog server. In 1002, it is determined whether the chunk is adjacent to a chunk already in the restore list. In the event that the chunk is not adjacent to a chunk already in restore list, then in 1004 chunk is added to restore list (e.g., a chunk offset and length are added to a list) such that restore list is sorted in order of offset (e.g., placing the chunk information in list such that the list is ordered, ordering the list after placing the chunk information in the list, etc.) and the process end. In the event that the chunk is adjacent to a chunk already in the restore list, then in 1006 it is determined whether the chunk is adjacent prior in offset. In the event that the chunk is adjacent prior (e.g., at a lower offset) in the chunk list, then in 1008 the chunk is coalesced with chunk(s) prior in the restore list (e.g., all adjacent chunks are coalesced into one long chunk so that the list is short and the reads are contiguous and few in number although potentially quite long), and the process ends. In the event that the adjacent chunk is not prior in offset, then in 1010, the chunk is coalesced with chunk(s) after in the restore list (e.g., all adjacent chunks are coalesced into one long chunk so that the list is short and the reads are contiguous and few in number although potentially quite long), and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for efficient building of a restore list, comprising:
  a processor, wherein the processor is configured to:
    receive a desired directory path to restore and to push the desired directory path onto the directory stack;
    create directory index records comprising:
      for each directory in a directory stack:
        retrieve a directory index associated with a first backup file from at least a subset of backup files that includes full backup files and incremental backup files;
        add one or more files or directories in the directory index of the first backup file to the directory index records if not already present;
        determine whether the first backup file is a full backup file or an incremental backup file;
        in the event that the first backup file is determined to be an incremental backup file, repeat retrieving a next most recent incremental backup file and adding one or more files or directories of the next most recent incremental backup file to the directory index records if not already present until a full backup file is reached;
create a restore list from the directory index records comprising:
for each record in the directory index records:
determine whether the record is a directory or a file;
in the event that the record is determined to be directory, push the directory associated with the record to the directory stack;
in the event that the record is determined to be a file, add an index record associated with the file to the restore list, wherein the index record comprises a file name indicator and a file location in a backup file where the file is stored in, wherein the file location in the backup file with the file name indicator comprises a file start point and a file length;
for each index record associated with the file added to the restore list:
determine whether the file is adjacent to another file in the restore list, wherein the file is adjacent to another file if they are from the same backup file and are stored adjacently in the same backup file;
in the event the file is adjacent to another file in the restore list, coalesce the file and the another file in the restore list, wherein coalescing the file comprises combining the file locations to create a single file location reference in the same backup file, wherein combining the file locations comprises a new file start point and a new file length, wherein the new file start point comprises a start point of the file and the another file that are adjacent and the new file length comprises the sum of the file length of the file and the another file that are adjacent; and
a memory coupled to the processor and configured to provide the processor with instructions.

2. A system as in claim 1, wherein the index record is retrieved from a catalog server.

3. A system as in claim 1, wherein the processor is further configured to retrieve a directory index record for a next popped directory from the directory stack.

4. A system as in claim 1, wherein the processor is further configured to determine whether the directory stack is empty, and in the event that the stack is empty then ending the process, and in the event that the stack is not empty then retrieve a directory index record for a popped directory from the directory stack.

5. A system as in claim 4, wherein the directory index record for the popped directory from the directory stack is retrieved from a catalog server.

6. A system as in claim 1, wherein the coalescing occurs after at least a portion of the restore list has been built.

7. A system as in claim 1, wherein the coalescing occurs after the entire restore list has been built.

8. A system as in claim 1, wherein the restore list is ordered by a storage location in a backup file of a chunk as indicated by an index record.

9. A system as in claim 1, wherein the desired directory comprises a directory of a data storage device that is backed up on a backup storage device.

10. A system as in claim 1, wherein the restore list comprises a list of files or chunks backed up on a backup storage device.

11. A system as in claim 1, wherein a location of the file locations comprises a location that is associated with an incremental backup.

12. A system as in claim 1, wherein a location of the file locations comprises a location that is associated with a full backup.

13. A system as in claim 1, wherein adding one or more files or directories in the directory index of the first backup file to the directory index records if not already present, further comprises: determining, for each of the one or more files or directories, whether the file or the directory is present in the directory index records, and adding the file or the directory to the directory index records only in the event that the file or the directory is determined to be not already present.

14. A system as in claim 1, wherein the processor is further configured to restore data from a backup storage device using the restore list.

15. A system as in claim 1, wherein adding one or more files or directories of the next most recent incremental backup file to the directory index records if not already present comprises determining whether the file or the directory is present already in the directory index records, wherein if the file or directory is present already in the directory index records then the file or directory has been superseded by a version already stored and referred to by a prior processed backup file.

16. A system as in claim 1, wherein the first backup file is a version created at a specific point in the past that is desired to be restored.

17. A method for building a restore list, comprising:
receiving a desired directory path to restore and to push the desired directory path onto the directory stack;
creating directory index records, comprising:
for each directory in a directory stack:
retrieving a directory index associated with a first backup file from at least a subset of backup files that includes full backup files and incremental backup files;
adding one or more files or directories in the directory index of the first backup file to the directory index records if not already present;
determining, using a processor, whether the first backup file is a full backup file or an incremental backup file;
in the event that the first backup file is determined to be an incremental backup file, repeating retrieving a next most recent incremental backup file and adding one or more files or directories of the next most recent incremental backup file to the directory index records if not already present until a full backup file is reached;
creating a restore list from the directory index records comprising:
for each record in the directory index records:
determining whether a record is a directory or a file;
in the event that the record is determined to be directory, pushing the directory associated with the record to the directory stack; and
in the event that the record is determined to be a file, adding an index record associated with the file to the restore list, wherein the index record comprises a file name indicator and a file location in a backup file where the file is stored, wherein the file location in the backup file with the file name indicator comprises a file start point and a file length;
for each index record associated with the file added to the restore list:

determining whether the file is adjacent to another file in the restore list, wherein the file is adjacent to another file if they are from the same backup file and are stored adjacently in location in the same backup file;

in the event the file is adjacent to another file in the restore list, coalescing the file and the another file in the restore list, wherein coalescing the file comprises combining the file locations to create a single file location reference in the same backup file, wherein combining the file locations comprises a new file start point and a new file length, wherein the new file start point comprises a start point of the file and the another file that are adjacent and the new file length comprises the sum of the file length of the file and the another file that are adjacent.

18. A computer program product for building a restore list, the computer program product being embodied in a non-transitory computer readable storage medium and comprising computer instructions for:

receiving a desired directory path to restore and to push the desired directory path onto the directory stack;

creating directory index records, comprising:

for each directory in a directory stack:

retrieving a directory index associated with a first backup file from at least a subset of backup files that includes full backup files and incremental backup files;

adding one or more files or directories in the directory index of the first backup file to the directory index records if not already present;

determining whether the first backup file is a full backup file or an incremental backup file;

in the event that the first backup file is determined to be an incremental backup file, repeating retrieving a next most recent incremental backup file and adding one or more files or directories of the next most recent incremental backup file to the directory index records if not already present until a full backup file is reached;

creating a restore list from the directory index records comprising:

for each record in the directory index records:

determining whether a record is a directory or a file;

in the event that the record is determined to be directory, pushing the directory associated with the record to the directory stack; and in the event that the record is determined to be a file, adding an index record associated with the file to the restore list, wherein the index record comprises a file name indicator and a file location in the backup file where the file is stored, wherein the file location in the backup file with the file name indicator comprises a file start point and a file length;

for each index record associated with the file added to the restore list:

determining whether the file is adjacent to another file in the restore list, wherein the file is adjacent to another file if they are from the same backup file and are stored adjacently in location in the same backup file;

in the event the file is adjacent to another file in the restore list, coalescing the file and the another file in the restore list, wherein coalescing the file comprises combining the file locations to create a single file location reference in the same backup file, wherein combining the file locations comprises a new file start point and a new file length, wherein the new file start point comprises a start point of the file and the another file that are adjacent and the new file length comprises the sum of the file length of the file and the another file that are adjacent.

* * * * *